United States Patent
Rogers et al.

(10) Patent No.: US 8,078,656 B1
(45) Date of Patent: Dec. 13, 2011

(54) DATA DECOMPRESSION WITH EXTRA PRECISION

(75) Inventors: Douglas H. Rogers, Gilroy, CA (US); Gary C. King, San Jose, CA (US); Walter E. Donovan, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1051 days.

(21) Appl. No.: 10/990,884

(22) Filed: Nov. 16, 2004

(51) Int. Cl.
*G06F 15/00* (2006.01)

(52) U.S. Cl. ....................................................... 708/200

(58) Field of Classification Search ........... 708/200–209
See application file for complete search history.

(56) References Cited

U.S. PATENT DOCUMENTS

| | | | | |
|---|---|---|---|---|
| 4,791,403 | A | * | 12/1988 | Mitchell et al. ............... 708/203 |
| 4,803,477 | A | | 2/1989 | Miyatake et al. |
| 5,109,417 | A | * | 4/1992 | Fielder et al. ................. 704/205 |
| 5,227,789 | A | | 7/1993 | Barry et al. |
| 5,495,542 | A | | 2/1996 | Shimomura et al. |
| 5,644,524 | A | * | 7/1997 | Van Aken et al. ............. 708/655 |
| 5,736,987 | A | | 4/1998 | Drucker et al. |
| 5,793,371 | A | | 8/1998 | Deering |
| 5,801,975 | A | * | 9/1998 | Thayer et al. ................. 708/402 |
| 5,831,640 | A | | 11/1998 | Wang et al. |
| 5,835,097 | A | | 11/1998 | Vaswani et al. |
| 5,841,442 | A | | 11/1998 | Einkauf et al. |
| 5,963,744 | A | * | 10/1999 | Slavenburg et al. .......... 708/200 |
| 6,052,127 | A | | 4/2000 | Vaswani et al. |
| 6,055,000 | A | | 4/2000 | Okada |
| 6,078,334 | A | | 6/2000 | Hanaoka et al. |
| 6,184,893 | B1 | | 2/2001 | Devic et al. |
| 6,501,851 | B1 | | 12/2002 | Kondo et al. |
| 6,546,409 | B1 | * | 4/2003 | Wong ............................ 708/655 |
| 6,580,828 | B1 | * | 6/2003 | Li ................................. 708/203 |
| 6,876,362 | B1 | | 4/2005 | Newhall, Jr. et al. |
| 7,109,999 | B1 | | 9/2006 | Lindholm et al. |
| 7,224,838 | B2 | | 5/2007 | Kondo et al. |
| 2002/0147753 | A1 | * | 10/2002 | Rao et al. ...................... 708/606 |
| 2003/0023646 | A1 | * | 1/2003 | Lin et al. ....................... 708/209 |
| 2003/0105788 | A1 | * | 6/2003 | Chatterjee ..................... 708/402 |
| 2003/0206177 | A1 | | 11/2003 | Hoppe et al. |
| 2003/0223490 | A1 | | 12/2003 | Kondo et al. |
| 2004/0151372 | A1 | | 8/2004 | Reshetov et al. |
| 2004/0207631 | A1 | | 10/2004 | Fenney et al. |
| 2005/0110790 | A1 | | 5/2005 | D'Amora |

OTHER PUBLICATIONS

Mark Adler, Gzappend, Nov. 4, 2003, http://svn.ghostscript.com/ghostscript/tags/zlib-1.2.3/examples/gzappend.c.*

* cited by examiner

*Primary Examiner* — Chat C Do

(57) ABSTRACT

Methods and systems for decompressing data are described. The relative magnitudes of a first value and a second value are compared. The first value and the second value represent respective endpoints of a range of values. The first value and the second value each have N bits of precision. Either the first or second value is selected, based on the result of the comparison. The selected value is scaled to produce a third value having N+1 bits of precision. A specified bit value is appended as the least significant bit of the other (non-selected) value to produce a fourth value having N+1 bits of precision.

6 Claims, 3 Drawing Sheets

US 8,078,656 B1

DATA DECOMPRESSION WITH EXTRA PRECISION

RELATED UNITED STATES PATENT APPLICATIONS

This application is related to U.S. patent application Ser. No. 10/990,990 by D. Rogers et al., filed on Nov. 16, 2004, entitled "Two Component Texture Map Compression," with assigned to the assignee of the present invention, and hereby incorporated by reference in its entirety.

FIELD OF THE INVENTION

Embodiments of the present invention generally relate to data decompression, in particular data used in connection with computer graphics.

BACKGROUND ART

As a result of continuing advances in computer graphics, images that look more and more realistic are being rendered in applications such as video games. A key to achieving a convincing image is the ability to realistically simulate lighting and shadowing effects on a textured (e.g., three-dimensional) surface.

One technique for rendering surface textures involves the use of normal maps. When rendering using normal maps, each point on a surface to be rendered is associated with a unit length vector that is perpendicular to that point. The normal vector indicates the direction that the surface is facing at that point. Using a normal map, contemporary graphics engines can render very complex looking surfaces to achieve a more realistic effect.

A normal map can contain a large quantity of data, especially when realistic-looking surfaces at high screen (display) resolutions are being portrayed. Compression schemes are usually employed to reduce the amount of data. However, conventional real-time compression techniques can result in a loss of precision when the data are reconstructed, leading to reduced image quality.

SUMMARY OF THE INVENTION

Accordingly, a system and/or method that can reconstruct compressed normals with improved precision would be advantageous. Embodiments in accordance with the present invention provide this and other advantages.

In one embodiment of the present invention, the relative magnitudes of a first value and a second value are compared. The first value and the second value represent respective endpoints of a range of values. The first value and the second value each have N bits of precision. Either the first or second value is selected, based on the result of the comparison. The selected value is scaled to produce a third value having N+1 bits of precision. A specified bit value is appended as the least significant bit of the other (non-selected) value to produce a fourth value having N+1 bits of precision. Intermediate values can then be determined by interpolating between the third and fourth values.

In one embodiment, the third and fourth values are nine (9) bits in length (that is, N+1 is 9). In one such embodiment, the first and second values are signed values normalized to the range of [−1, 1] coded in eight (8) bits each (e.g., one byte), the 8 bits having a value in the range of [−127, 127]. In another such embodiment, the first and second values are unsigned values coded in 8 bits each, the 8 bits having a value in the range of [0, 255].

In one embodiment, the data being decompressed include texel data used in connection with computer graphics systems. In such an embodiment, the third and fourth values of N+1 bits (and the first and second values of N bits) correspond to one component (e.g., the x-component or the y-component, etc.) of a texel at a location in a block of data. However, the decompression method described above can be applied to any number of components in other types of applications.

In summary, embodiments of the present invention provide methods and systems for decompressing data with improved precision. As a result, the quality of rendered images can be increased. Importantly, the improvement in precision is achieved without actually storing extra bits of precision in a block of compressed data. In effect, the extra bits of precision are "virtual" bits that are not stored in the compression block, but instead are derived from other information in the compression block. Thus, improved precision is achieved without significantly increasing the burden on computational resources and without increasing the size or changing the structure of the compression block. These and other objects and advantages of the various embodiments of the present invention will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

Figure 1:
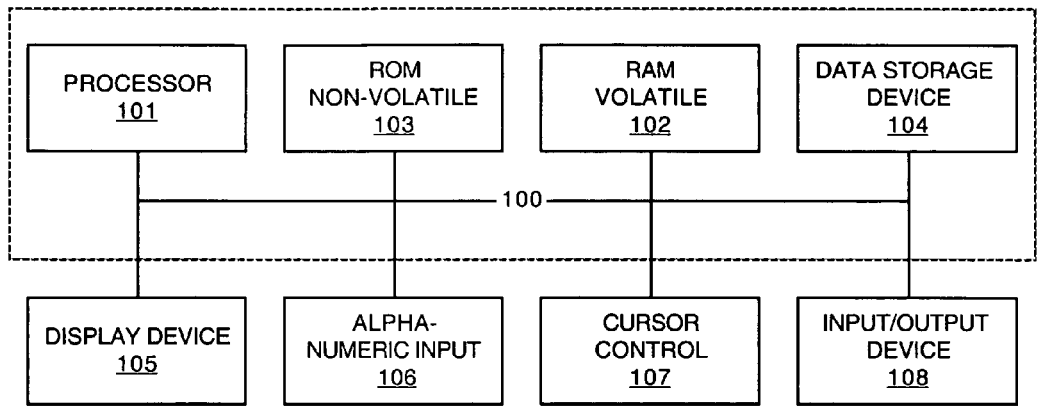
FIG. 1 is a block diagram of an exemplary computer system upon which embodiments of the present invention can be implemented.

The drawings referred to in the description should not be understood as being drawn to scale except if specifically noted.

DETAILED DESCRIPTION OF THE INVENTION

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "comparing," "storing," "using," "compressing," "decompressing," "restoring," "determining," "constructing," "producing," "accessing," "calculating," "selecting," "associating," "truncating," "scaling," "appending" or the like, refer to actions and processes (e.g., flowchart 60 of FIG. 6) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

FIG. 1 is a block diagram of an exemplary computer system 112 upon which embodiments of the present invention can be implemented. Computer system 112 includes an address/data bus 100 for communicating information, a central processor 101 coupled with bus 100 for processing information and instructions; a volatile memory unit 102 (e.g., random access memory [RAM], static RAM, dynamic RAM, etc.) coupled with bus 100 for storing information and instructions for central processor 101; and a non-volatile memory unit 103 (e.g., read only memory [ROM], programmable ROM, flash memory, etc.) coupled with bus 100 for storing static information and instructions for processor 101. Computer system 112 also includes a display device 105 coupled to bus 100 for displaying information to the computer user. Moreover, computer system 112 also includes a data storage device 104 (e.g., disk drive) for storing information and instructions. The memory unit 102, the memory unit 103, and the data storage device 104 are examples of computer-usable media.

Also included in computer system 112 is an optional alphanumeric input device 106. Device 106 can communicate information and command selections to central processor 101. Computer system 112 also includes a cursor control or directing device 107 coupled to bus 100 for communicating user input information and command selections to central processor 101. Computer system 112 also includes signal communication interface (input/output device) 108, which is also coupled to bus 100. Communication interface 108 can also include wireless communication mechanisms.

It is appreciated that computer system 112 described herein illustrates an exemplary configuration of an operational platform. Nevertheless, other computer systems with differing configurations can also be used in place of computer system 112 within the scope of the present invention. These other types of computer systems can include workstations and thin client devices that are coupled to other computer systems in a distributed computer system network. Computer system 112 may be any type of computing device, such as but not limited to a personal computer, a game console, a personal digital assistant, a cell phone, a portable digital device, etc.

Figure 2:
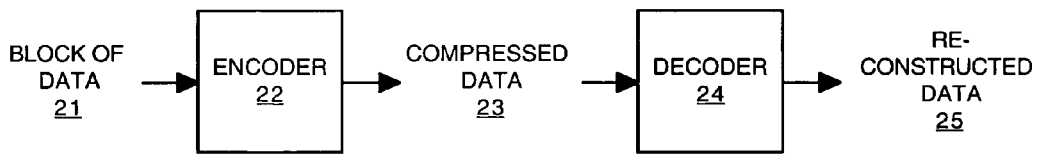
FIG. 2 is a block diagram showing the flow of data into and out of a data encoder, and into and out of a data decoder, according to one embodiment of the present invention.

FIG. 2 is a block diagram showing the flow of data into and out of a data encoder 22, and into and out of a data decoder 24, according to one embodiment of the present invention. Encoder 22 compresses the data 21 using an encoding scheme that is described more fully in conjunction with FIGS. 3 and 4 and Table 1. In overview, encoder 22 selects anchor points or endpoints that bound the range of values of the data 21. The anchor points are used to generate a palette (e.g., a lookup table) containing values that lie between the anchor points. A unique index or bit code is associated with each of the anchor points and with each of the intermediate values. The bit codes can be used to encode each of the values in data 21 to generate the compressed data 23. In essence, each of the values in data 21 is replaced with a bit code that is shorter in length. For example, integer values zero (0) through seven (7), a total of eight values, can each be encoded as a bit code that is three bits in length.

The compression block includes the two anchor points and the encoded bit codes. Thus, compressed data 23 includes fewer bits than are included in data 21. Decoder 24 of FIG. 2 decompresses (reconstructs) the compressed data 23 to generate the reconstructed data 25. In general, the anchor points are used to reconstruct the palette. The palette is used with the encoded bit codes to construct a decompressed version of the original data. Additional information is provided in conjunction with FIGS. 5 and 6 and Tables 2, 3, 4 and 5, below.

Figure 3:
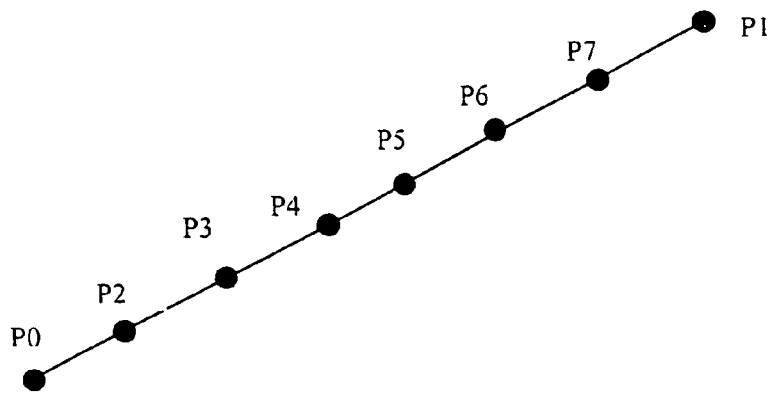
FIG. 3 illustrates a palette that includes anchor endpoints and other points derived from the endpoints according to one embodiment of the present invention.

FIG. 3 illustrates a palette that includes anchor endpoints and other points derived from the endpoints according to one embodiment of the present invention. The use of a palette for encoding data is described further in conjunction with FIG. 4 below.

With reference to FIG. 3, in the present embodiment, two anchor points (P0 and P1) are defined. The remaining points P2 through P7 are derived using percentages of P0 and P1.

In general, the points P0 and P1 are each represented using N+1 bits and encoded using N bits. In one embodiment, the points P0 and P1 are each represented using nine (9) bits and encoded (compressed) using eight (8) bits each. In one embodiment, this is accomplished by truncating the least significant bit from each of P0 and P1.

Six other points (P2, P3, P4, P5, P6 and P7) are linearly interpolated using P0 and P1, yielding a total of 8 values for the palette. Each of the points P0 through P7 is associated with a three (3) unique bit code (refer to the discussion of FIG. 4 below).

Table 1 provides one example of code that can be used to generate a palette according to one embodiment of the present invention.

TABLE 1

Exemplary Code for Generating a Palette

| | |
|---|---|
| P0 = | // bit code 000 |
| P1 = | // bit code 001 |
| P2 = (6 * P0 + 1 * P1) / 7; | // bit code 010 |
| P3 = (5 * P0 + 2 * P1) / 7; | // bit code 011 |
| P4 = (4 * P0 + 3 * P1) / 7; | // bit code 100 |
| P5 = (3 * P0 + 4 * P1) / 7; | // bit code 101 |
| P6 = (2 * P0 + 5 * P1) / 7; | // bit code 110 |
| P7 = (1 * P0 + 6 * P1) / 7; | // bit code 111 |

According to the various embodiments of the present invention, P0 and P1 are either signed values or unsigned values. Signed values are normalized to the range [−1, 1] and the interpolation scheme described above (Table 1) is used, except the values for P0 and P1 are signed and the results are not clamped to integer values.

The present invention will be described for an embodiment in which the data to be compressed (encoded) are associated with a single component. Although described in the context of a single component, embodiments in accordance with the present invention are not so limited. Embodiments of the present invention can also be applied to other types of multiple-element, unconstrained or arbitrary data such as spherical harmonic data, by applying multiples of the elements of the compression/decompression scheme described herein (that is, by applying the scheme described herein to each component when there are multiple components).

Figure 4:
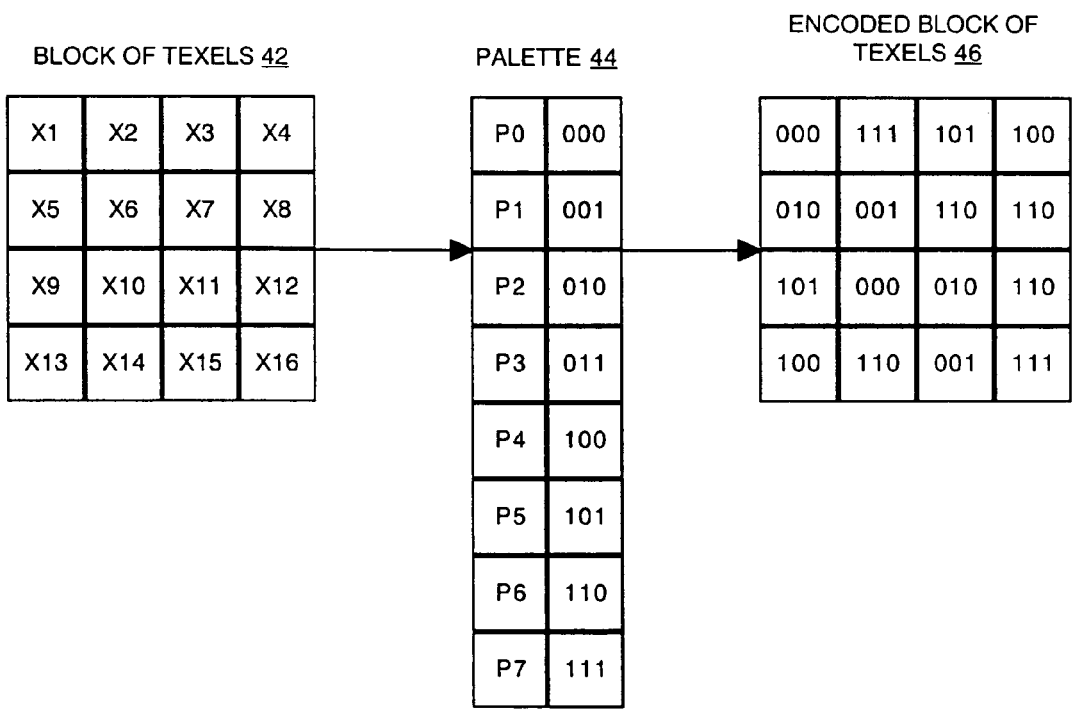
FIG. 4 is a data flow diagram showing a manner in which a palette can be used to encode data according to one embodiment of the present invention.

FIG. 4 illustrates how a palette 44 can be used to encode data according to one embodiment of the present invention. Palette 44 is a memory-resident data structure and includes the anchor points P0 and P1 and the intermediate range of values P2 through P7 that were interpolated using P0 and P1. Each of the values P0 through P7 is indexed by a respective and unique bit code. In the present embodiment, the bit code uses three (3) bits.

In the example of FIG. 4, the x-component (X1, X2, . . . , X15, X16) of the normal vector associated with each texel in a memory-resident block of texels 42 is to be encoded. The x-component example can be extended readily to other components of normal vectors (e.g., the y-component), or other types of components used in other types of coordinate or reference systems. That is, as mentioned above, the present invention is not limited in application to only a single component, nor is the present invention limited to the components of normal vectors. Also, although the block of texels 42 includes 16 texels, the present invention is not so limited.

In the present embodiment, during the compression phase, the x-component values X1 through X16 are each compared to the values P0 through P7, in order to determine which of the values in the palette 44 each x-component value is closest to. For instance, if the value X1 is compared to the values P0 through P7 and found to be closest to the value P0, then bit code 000 would be associated with X1. Similarly, if X5 is found to be closest to P2, then bit code 010 would be associated with X5. In general, each of the data values in the block of texels 42 is associated with a bit code selected from palette 44. As a result, a memory-resident encoded block of texels 46 includes an exemplary bit code or index for each of the values in block of texels 42.

Figure 5:
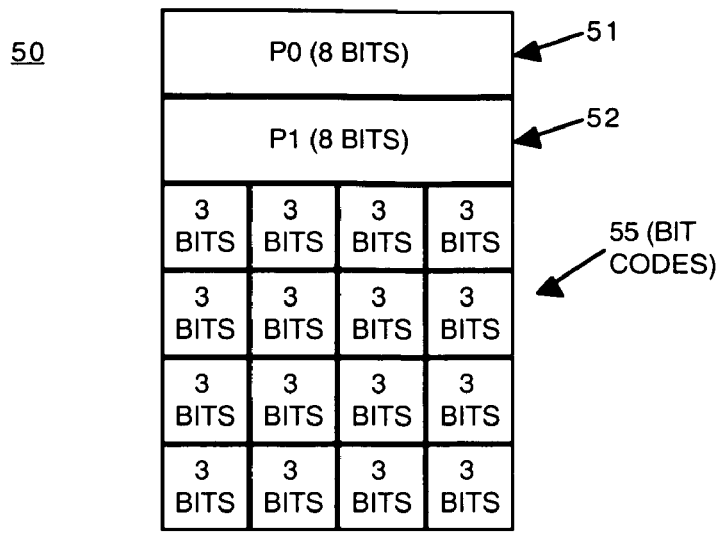
FIG. 5 illustrates a memory-resident block of compressed data according to one embodiment of the present invention.

FIG. 5 illustrates memory-resident compression block 50 according to one embodiment of the present invention. As can be seen, portion 55 actually includes a plurality of portions, each portion holding or storing a bit code for each x-component in the block of texels 42 (FIG. 4).

In the example of FIG. 5, compression block 50 includes a first portion 51 for holding or storing a first encoded value (e.g., P0), a second portion 52 for holding or storing a second encoded value (e.g., P1), and a portion 55 for holding or storing selected bit codes (e.g., the bit codes selected from palette 44 of FIG. 4). In one embodiment, each of the bit codes in portion 55 is 3 bits in length. In one embodiment, the portions 51 and 52 are each 8 bits in length.

As mentioned above, in one embodiment, the endpoints P0 and P1 are each represented using N+1 (e.g., 9) bits before they are encoded as N-bit (e.g., 8-bit) strings. In other words, in general, P0 and P1 are each reduced from N+1 bits to N bits before they are stored in compression block 50. In one embodiment, this is accomplished by truncating the least significant bit from each of P0 and P1.

Compression block 50 is decompressed by decoder 24 of FIG. 2. As mentioned above, the data represented by compression block 50 may be either signed or unsigned.

Table 2 provides one example of code used for unsigned decompression in accordance with the present invention.

TABLE 2

Exemplary Code for Unsigned Decompression

```
if P0>P1
    P1=(P1<<1) | 1;      //shift P1 left by 1 and set the least
significant bit (lsb) to 1
    unsigned scale P0 to 9 bits
else
    P0=(P0<<1) | 0;      //shift P0 left by 1 and set lsb to 0
    unsigned scale P1 to 9 bits
```

One example of the "unsigned scale operation" mentioned in Table 2 is provided in Table 3.

TABLE 3

Exemplary Code for Unsigned Scale Operation

```
out=(in<<1) | (in>>7)   //shift the input (P0 or P1) left by 1 and
shift the input (P0 or P1) right by 7, and concatenate the two
pieces to get a 9-bit output (P0 or P1)
```

The exemplary code of Table 3 is a fixed point operation equivalent to the floating point operation given by:

$$out = (int)floor(in*511.0/255.0+0.5).$$

Scaling by 511/255 is being done so that 8 bits are scaled to 9 bits such that values in the range [0 . . . 255] map as evenly as possible to the range [0 . . . 512]. Similarly, for signed values, the signed range [−127 . . . 127] is mapped as evenly as possible to the signed range [−255 . . . 255], as described below.

Table 4 provides one example of code used for signed decompression in accordance with the present invention.

TABLE 4

Exemplary Code for Signed Decompression

```
if abs (P0) >abs (P1)    //"abs" refers to the absolute value
    P1=(P1<<1) | 1;      //shift P1 left by 1 and set lsb to 1
    signed scale P0 to 9 bits
else
    P0=(P0<<1) | 0;      //shift P0 left by 1 and set lsb to 0
    signed scale P1 to 9 bits
```

One example of the "signed scale operation" mentioned in Table 4 is provided in Table 5.

TABLE 5

Exemplary Code for Signed Scale Operation out=(in==-128) ?-256: ((in<0) ?- (((-in)<<1) | ((-in)>>6)) : ((in<<1) | (in>>6)))
//where "in" and "out" are either P0 or P1

The exemplary code of Table 5 is a fixed point operation equivalent to the floating point operation given by:

out=(in==-128)?-256:(int)floor(I*255.0/127.0+0.5).

The decompressed 9-bit P0 and P1 values are used in the interpolation of Table 1 to construct the palette values. Note that although the decompressed P0 and P1 are 9-bit values, the palette values are not limited to 9 bits of precision. That is, the values interpolated from P0 and P1 can be greater than 9 bits in length.

Figure 6:
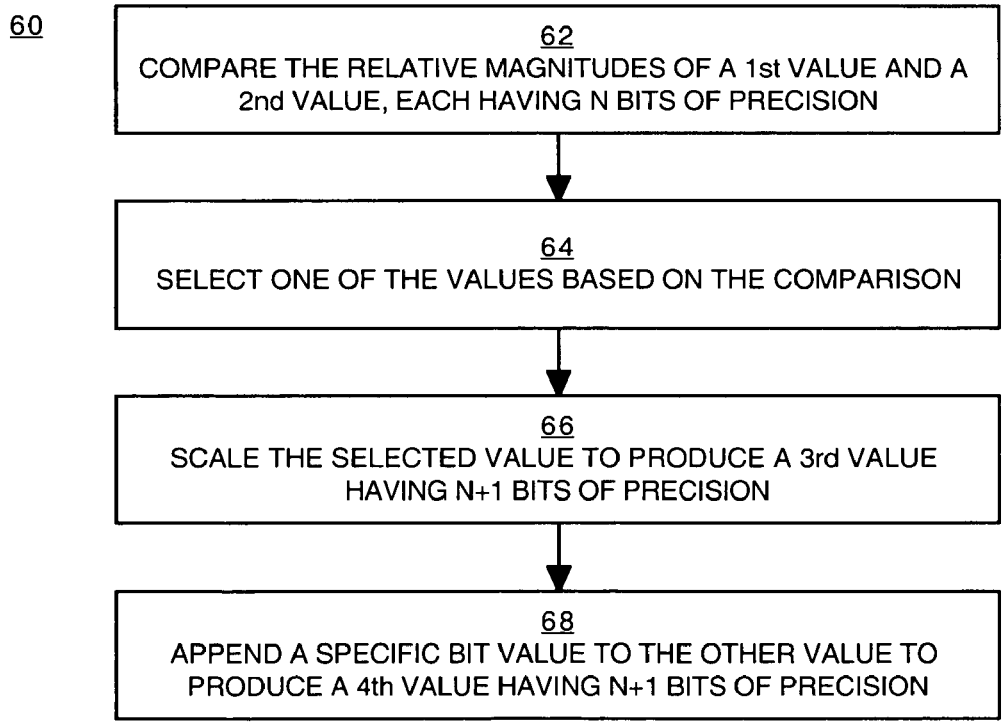
FIG. 6 is a flowchart of an exemplary computer-implemented method for decompressing data in accordance with one embodiment of the present invention.

FIG. 6 is a flowchart 60 of a computer-implemented method for decompressing data in accordance with one embodiment of the present invention. Although specific steps are disclosed in flowchart 60, such steps are exemplary. That is, the present invention is well suited to performing various other steps or variations of the steps recited in flowchart 60. It is appreciated that the steps in flowchart 60 may be performed in an order different than presented and that the steps in flowchart 60 are not necessarily performed in the sequence illustrated. In one embodiment, flowchart 60 is implemented as program instructions stored in computer-readable memory units of computer system 112 and executed by processor 101 (FIG. 1). In the present embodiment, flowchart 60 provides a general description of the operations described by Tables 2, 3, 4 and 5.

In step 62 of FIG. 6, in the present embodiment, the relative magnitudes of a first value and a second value in a memory-resident compression block are compared (see Tables 2 and 4). The first value and the second value represent respective endpoints of a range of values, and each have N bits of precision. With reference to FIG. 5, in one embodiment, the magnitude of a value in portion 51 of compression block 50 is compared to the magnitude of a value in portion 52. The first and second values may be signed or unsigned. If the values are signed, the absolute values of the first and second values are compared.

In step 64 of FIG. 6, depending on the results of the comparison, either the first value or the second value is identified as being the value that is larger in magnitude (see Tables 2 and 4).

In step 66, in one embodiment, the value identified in step 64 is scaled to produce a third value that has N+1 bits of precision. That is, in one embodiment, the value that has the larger magnitude is scaled using a scaling operation. In one embodiment, the value is scaled using one of the scaling operations described by Tables 3 and 5.

In step 68, in one embodiment, a specified bit value (e.g., either 0 or 1) is appended as the least significant bit (lsb) to the other value (e.g., the value that has the smaller magnitude) to produce a fourth value that has N+1 bits of precision. As shown by Tables 2 and 4, the specified bit value depends on which of the first and second values is identified in step 64 as having the larger magnitude. Looking at Table 2, for example, if P0 has the greater magnitude, then a value of 1 is appended to P1 as the least significant bit of P1, while if P1 has the greater magnitude, then a value of 0 is appended to P0 as the least significant bit of P0.

The third and fourth values determined according to flowchart 60 can then be used to interpolate a range of other values, for example to reconstruct a palette as described previously herein.

In summary, embodiments of the present invention provide methods and systems for compressing and reconstructing data with improved precision. As a result, the quality of rendered images can be increased. The improvement in precision is achieved without actually storing extra precision bits. In effect, the extra precision bits are "virtual" bits that are not stored in the compression block, but whose values are derived from other information that is stored in the compression block. Thus, improved precision is achieved without significantly increasing the burden on computational resources and without increasing the size or changing the structure (format) of the compression block.

Embodiments of the present invention, data decompression with extra precision, are thus described. While the present invention has been described in particular embodiments, it should be appreciated that the present invention should not be construed as limited by such embodiments, but rather construed according to the below claims.

What is claimed is:

1. A computer system comprising:
   a processor; and
   a memory unit coupled to said processor, said memory unit having computer-readable program instructions stored therein that when executed cause said computer system to implement a method for processing data, said method comprising said computer system:
   comparing the magnitude of a first value and the magnitude of a second value in a compression block resident in said memory unit, wherein said first and second values are stored in a particular order relative to one another in said compression block, said first value and said second value representing respective endpoints of a range of values, said first value and said second value each having N bits, wherein said first and second values are either: signed values normalized to the range of [−1, 1] coded in eight (8) bits each, said 8 bits having a value in the range of [−127, 127], or unsigned values coded in 8 bits each, said 8 bits having a value in the range of [0, 255];
   selecting one of said first and second values according to the result of said comparing, thereby yielding a selected value that is one of said first and second values and an unselected value that is the other of said first and second values, wherein said selected value has a larger magnitude than said unselected value;
   scaling said selected value to produce a third value representing a decompressed value of said selected value and having N+1 bits of precision;
   using said particular order in which said first and second values are stored in said compression block to derive a specified one-bit value, wherein said specified one-bit value has one binary value if said first value is stored before said second value in said compression block and otherwise said specified one-bit value has the other binary value, wherein said specified one-bit value is appended to said unselected value as the least significant bit of said unselected value to produce a fourth value representing a decompressed value of said unselected value and having N+1 bits of precision; and
   interpolating values that have N+1 bits of precision using said third and fourth values.

2. The computer system of claim 1 wherein, if said first and second values are signed values, then said comparing of said method uses the absolute values of said first and second values.

3. The computer system of claim 1 wherein said data comprise data for a normal map used in graphics processing.

4. A non-transitory computer-readable storage medium having program instructions stored therein for causing a computer system to perform a method comprising:
   comparing the magnitude of a first value and the magnitude of a second value in a memory-resident compression block, wherein said first and second values are stored in a particular order relative to one another in said compression block, said first value and said second value representing respective endpoints of a range of values, said first value and said second value each having N bits, wherein said first and second values are either: signed values normalized to the range of [−1, 1] coded in eight (8) bits each, said 8 bits having a value in the range of [−127, 127], or unsigned values coded in 8 bits each, said 8 bits having a value in the range of [0, 255];
   selecting one of said first and second values according to the result of said comparing, thereby yielding a selected value that is one of said first and second values and an unselected value that is the other of said first and second values, wherein said selected value has a larger magnitude than said unselected value;
   scaling said selected value to produce a third value representing a decompressed value of said selected value and having N+1 bits of precision; and
   using said particular order in which said first and second values are stored in said compression block to derive a specified single bit value, wherein said specified single bit value has one binary value if said first value is stored in a position in said compression block that is read before said second value and otherwise said single bit value has the other binary value, wherein said single bit value is appended to said unselected value as the least significant bit of said unselected value to produce a fourth value representing a decompressed value of said unselected value and having N+1 bits of precision.

5. The non-transitory computer-readable storage medium of claim 4 wherein, if said first and second values are signed values, then said comparing uses the absolute values of said first and second values.

6. The non-transitory computer-readable storage medium of claim 4 wherein said range of values comprise data for a normal map used in graphics processing.

\* \* \* \* \*